Figure 1:
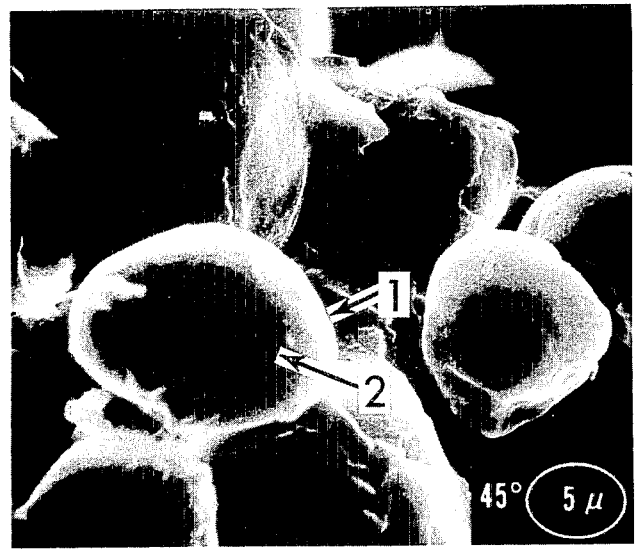

United States Patent
Christianson et al.

[15] 3,661,593
[45] May 9, 1972

[54] PROTEIN CONCENTRATES FROM BUFFER TREATED CEREAL ENDOSPERM PRODUCTS

[72] Inventors: Donald D. Christianson, Peoria; Arthur C. Stringfellow, Washington; Joseph S. Wall, Peoria, all of Ill.

[73] Assignee: The United States of America as represented by the Secretary of Agriculture

[22] Filed: Apr. 24, 1970

[21] Appl. No.: 31,542

[52] U.S. Cl............................................99/17, 99/80, 99/93, 127/67
[51] Int. Cl............................................A23j 1/12, A23d 6/00
[58] Field of Search................................99/17, 80, 93, 93 A; 260/112 G, 112; 127/24, 67, 68, 69

[56] References Cited

UNITED STATES PATENTS 2,946,780  7/1960  Barker et al. ........................260/123.5

*Primary Examiner*—A. Louis Monacell
*Assistant Examiner*—William Andrew Simons
*Attorney*—R. Hoffman and W. Bier

[57] ABSTRACT

An improvement has been made in processes for preparing protein enriched products from cereal grains. Protein which envelopes starch particles in cereal endosperm is loosened by hydration in an aqueous buffer solution. Standard commercial procedures such as grinding, milling, air classification, or screening can be used to prepare the desired products.

8 Claims, 2 Drawing Figures

D.A. CHRISTIANSON
A.C. STRINGFELLOW
J.S. WALL

INVENTORS

BY R. Hoffman

ATTORNEY

PROTEIN CONCENTRATES FROM BUFFER TREATED CEREAL ENDOSPERM PRODUCTS

BACKGROUND OF THE INVENTION

This invention relates to an improvement in the production of cereal grain products having a variety of protein concentrations. More specifically, it relates to an improved means of separating protein and starch in cereal grains to obtain new cereal products. Most specifically, it relates to a process which sloughs off the protein envelope around the starch granules in the cereal grain endosperm.

As cereal grain kernels develop in the field, protein remains essentially loose and free from the starch granules, but when the ripened kernel dehydrates, protein and starch agglomerate. These agglomerates can be finely ground but the protein remains attached to the starch. Users of cereal flours, until recently, had to depend on varietal differences for flours having desired protein concentrations. Air classification has now provided a means for obtaining enriched protein fractions that can be added back to control the composition of flour (Griffin and Pfeifer, Food Eng., January 1965). Dry milling methods, the major method of producing edible cereal products, generally start with tempering the kernels with water, after which the hydrated kernel is dehulled (usually abrasively), the germ is removed, and the endosperm collected and dried giving the three major cereal endosperm materials: grits, meal, and flour. If any separation of protein and starch is desired, the above cereal endosperm materials are fine ground and air classified.

Air classification separation of these finely ground products has been somewhat successful in obtaining high-protein concentrates from corn and sorghum. High-protein flours are desirable for specialty baked goods such as breads, crackers, and snack foods. High-protein flours can also be used to supplement carbohydrate food products. Dry milling and air classification procedures necessary for producing specialty wheat flours are expensive in that the fractions obtained which have the desired amount of protein are small. Only a small portion of the total wheat protein can be shifted to these high-protein fractions, Griffin and Pfeifer, supra; see also Trotter and Miller, American Miller and Proc., June 1964. The remaining fractions have a protein content only slightly less than the original flour. For industrial purposes, it is necessary to have starch fractions containing less than 3 percent protein.

The primary object of the invention is to loosen and slough off the protein envelope around starch granules in cereal endosperm, making the starch and protein easier to separate and thereby improving dry milling processes so that edible products having a wide variety of protein concentrations can be obtained from cereal grains including corn, sorghum, and wheat.

In accordance with the invention, an improved process of preparing protein enriched products from cereal endosperm materials has been developed. Generally, endosperm materials (grits, meal, and flour) are milled and classified (e.g., sieving or air classification) into products having varying protein concentrations. The instant invention is an improvement over the above process which comprises soaking the cereal endosperm in an isotonic buffer.

In the process described above, the endosperm products are soaked in a buffer comprising 0.1M potassium phosphate buffer (pH 7.5) containing 0.006M magnesium chloride. This buffer is approximately isotonic relative to corn tissue. Also, in the above process, the cereal products are prepared from corn, sorghum, and wheat.

The drawings consist of two scanning electron photomicrographs at 3,000X's magnification of starch particles of corn break flour.

Figure 2:
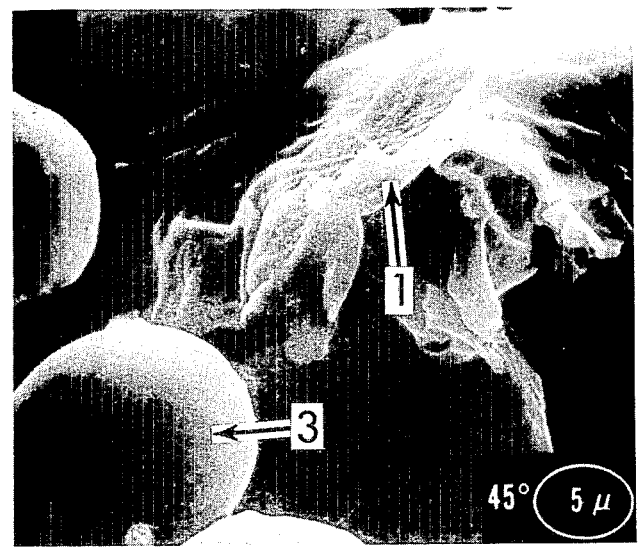

FIG. 1 shows the flour before isotonic buffer treatment, and
FIG. 2 shows the same flour after isotonic buffer treatment.

DETAILED DISCUSSION OF THE INVENTION

A variety of cereal endosperm materials were subjected to the isotonic buffer of the instant invention. An isotonic buffer is one that has the same osmotic pressure, ionic strength, and pH as the natural cell fluid in the endosperm. FIG. 1 shows particles of corn break flour magnified 3,000X. Particle 2 is a typical starch particle enveloped by a protein sheath 1. FIG. 2 shows under the same magnification the same sample of corn break flour which has been slurried with isotonic buffer for 24 hours at 4° C., and low temperature dried. Particle 3 is the starch particle after the protein sheath 1 has been sloughed off by the buffer. The buffer used for the examples was composed of 0.1M potassium phosphate buffer (pH 7.5) containing 0.006M magnesium chloride. However, if variations were found in the isotonic conditions in different grain cells corresponding changes should be made in the buffer.

The instant invention has essentially only three parameters: amount of buffer used in relation to the cereal endosperm product; time of soaking; and temperature of soaking. A quantity of buffer sufficient to cover each cereal endosperm particle at from 4° C. to room temperature for a period of from 1 to 24 hours will slough the protein sheath from the starch granules as seen by the scanning electron microscope. Amounts of protein found in the various fractions obtained from classification procedures such as sieving or air classification are also used as criteria for showing this starch-protein agglomerate disruption. Since endosperm materials from normal milling give only a small separation when subjected to classification procedures, particle size weight distribution of the treated materials subjected to the same procedures provide a good qualitative measure of disruption.

Table 1 compares the weight distribution obtained from sieving high-lysine corn flour (see Example 1) treated under a variety of conditions including buffer concentrations, times, and temperatures. The preferred amount of buffer is 0.5 l. per 50 g. of cereal endosperm material, which forms an easily stirrable slurry. However, when the buffer is filtered off and the remaining material weighed, it was found that an amount of buffer equal to 45 percent of the cereal endosperm product had been adsorbed. This was felt to be the minimum amount of buffer that would achieve the desired disruption of protein from starch. It can be seen from the data in Table 1 that neither the control (flour sieved with no buffer treatment) nor the flour treated for 20 minutes with 45 percent buffer by weight have been disrupted. A 3-hour treatment with 45 percent buffer does give the desired protein and weight distribution. When a slurry of buffer and high-lysine corn flour was stirred for 1 hour at 24° C., the weight distribution of the sieved fractions was very nearly the same as the weight distribution obtained from the product of the preferred treatment (i.e., 0.5 l. buffer per 50 g. flour, stirred 24 hours at 4° C.), Table 1. The percent protein in the fractions obtained from the 3-hour 45 percent buffer treatment are essentially the same as the comparable fractions obtained from the 24-hour, 4° C. stirred slurry treatment.

Table 2 compares percent protein and weight distribution in sieved fractions obtained from high-lysine corn grits (12.4 percent protein) which have been hammer milled through a 0.027-inch mesh screen followed by either buffer treatment, water treatment (stirred 24 hours at 4° C.), or no further treatment. Percent protein analysis and the weight distribution in the sieved fraction obtained from water treated-hammer milled grits and those having no treatment show that little or no disruption of the starch-protein agglomerates has taken place, Table 2. The similarity between these data indicates that the distribution of particle size is due to hammer milling and not the water treatment. The fact that there is little difference in percent protein in any of the fractions from these two samples means that the protein has not sloughed off the starch particles. The protein and starch are essentially evenly distributed among all fractions. Data from the buffer treated samples in Table 2 show considerable distribution in both percent protein and in particle size. There are fractions that vary

TABLE 1

| Fraction | Control yield, percent | 45% buffer [1] | | | Buffer treated [2] | | |
|---|---|---|---|---|---|---|---|
| | | 20 min. yield, percent | 3 hr. | | 1 hr.-22° C. yield, percent | 24 hr.-4° C. | |
| | | | Percent P[3] | Percent wt.[4] | | Percent P[3] | Percent wt.[4] |
| +90μ | 89 | 90 | 12.2 | 44 | 59 | 13.0 | 24 |
| +75μ | 4 | 4 | 11.1 | 13 | 13 | 11.0 | 10 |
| +60μ | 3 | 2 | 11.6 | 8 | 11 | 9.6 | 9 |
| +45μ | 0 | 2 | 9.5 | 10 | 12 | 6.8 | 15 |
| +30μ | 0 | 2 | 7.8 | 17 | 14 | 5.2 | 26 |
| +20μ | 0 | 0 | 5.7 | 9 | 3 | 4.5 | 18 |
| +10μ | 0 | 0 | 0 | 0 | 0 | 0 | 0 |

[1] Not stirred, buffer 45% of sample wt.
[2] Stirred, 0.5 l. buffer/50 g. flour.
[3] Percent P = percent protein in fraction.
[4] Percent wt. = percent of total sample weight.

TABLE 2

| | High-lysine corn grits [1] | | | | | | | |
|---|---|---|---|---|---|---|---|---|
| | Nontreated | | Water | | Buffer, 24 hr.-4° C. | | Buffer, 1 hr.-22° C. | |
| Fraction | Percent P[2] | Percent wt.[3] | Percent P[2] | Percent wt.[3] | Percent P[2] | Percent wt.[3] | Percent P[2] | Percent wt.[3] |
| +90μ | 12.8 | 46 | 10.4 | 30 | 18.0 | 8 | 17.9 | 16 |
| +75μ | 9.9 | 19 | 10.8 | 25 | 17.2 | 10 | 11.1 | 11 |
| +60μ | 9.1 | 19 | 15.4 | 20 | 15.4 | 10 | 9.9 | 13 |
| +45μ | 12.6 | 13 | 15.2 | 21 | 12.6 | 19 | 9.6 | 21 |
| +30μ | 12.0 | 4 | 15.3 | 4 | 10.4 | 29 | 7.8 | 28 |
| +20μ | 0 | | | 0 | 8.0 | 21 | 8.3 | 10 |
| +10μ | 0 | | | 0 | 5.6 | 4 | 0 | 2 |

[1] Hammer milled through 0.027-inch mesh screen before treatment.
[2] Percent P = percent protein in fraction.
[3] Percent wt. = percent of total sample weight.
[4] Buffer is 45% of the sample weight.

from 5.6 percent to 18 percent protein. Since the original grits contain 12.4 percent protein, it is evident that the protein has been separated from the starch by the buffer treatment. The similarity in the data from the 24-hour, 4° C. and the 1-hour, 22° C. buffer treated-hammer milled grits substantiates the fact that the parameters of time and temperature are not critical. Results similar to those in Tables 1 and 2 which have been obtained from the examples can be seen in Table 4. The various untreated cereal endosperm materials do give some distribution when subjected to the sieving procedure (see Example 1), but in each example the major portion stays in the 90 μ sieve. In all the buffer treated samples the major portion of the weight is distributed among the smaller mesh sizes. In Examples 2, 3, and 4, Table 4, the largest weight fraction is in the smallest mesh size. Protein distribution in the fractions obtained from buffer treated materials, in every example, is highest in the largest mesh size and progressively decreases as the mesh size decreases. The result is a number of cereal endosperm products containing protein concentrations that vary from as little as one third to almost three times the amount of protein in the original dry milled material.

Salt solutions other than those in the isotonic buffer were used to treat wheat flour under the conditions described in Example 1. Weight distributions obtained from sieving these products are compared to weight distributions obtained from untreated control, water treated, and buffer treated wheat flour samples, Table 3. It has been shown that untreated and water treated cereal endosperm products do not give the desired distribution of protein, and Table 3 shows that $Na_2CO_3$ and $Na_3PO_4$ solutions do not give the desired weight distribution indicating no starch-protein disruption. Furthermore, scanning electron microscopy show little, if any, starch-protein disruption from the $Na_2CO_3$ and $Na_3PO_4$ solution treatments. Only the isotonic buffer described here will slough off the protein sheaths that naturally surround the starch particles of dry milled cereal endosperm materials as is shown by scanning electron microscopy and normal classification procedures. The classification procedures described in the following examples are laboratory procedures, and it should be evident that other processes can be used to give a large variety of products with varying concentrations of protein.

EXAMPLE 1

Fifty g. of Ponca hard red winter wheat flour analyzing 10.3 percent protein was stirred with 0.5 l. of isotonic buffer for 24 hours at 4° C. The isotonic buffer is composed of 0.1M $KH_2PO_4$ and 0.006M $MgCl_2 \cdot 6H_2O$ at pH 7.5. At the end of the 24-hour soaking period, the resulting mixture of starch and protein was dried. A portion of the dried material was sieved through a series of BMC micromesh screens (30, 45, 60, 75, and 90 μ) in a Ro-Tap sieve shaker for 10 minutes. A portion of the original flour was sieved in the same way and the results of weight distributed into the fractions compared in Table 4. The sieved fractions from the treated flour were subjected to protein analysis and these results also appear in Table 4.

EXAMPLE 2

Fifty g. of red endosperm sorghum flour obtained by dry milling having 8.6 percent protein were buffer treated, sieved, and analyzed for protein in the same manner as described in Example 1. The results are compared to those of sieved original flour in Table 4.

TABLE 3

| | pH | Percent weight | | | | |
|---|---|---|---|---|---|---|
| | | 90μ | 75μ | 60μ | 45μ | 30μ |
| Control | | 36 | 22 | 16 | 17 | 9 |
| Water | 6.0 | 71 | 23 | 5 | 1 | 0 |
| 0.5% $Na_2CO_3$ | 8.5 | 55 | 24 | 9 | 6 | 3 |
| 0.5% $Na_3PO_4$ | 6.9 | 87 | 9 | 3 | 1 | 0 |
| Buffer | 7.2 | 11 | 25 | 24 | 26 | 15 |

EXAMPLE 3

Fifty g. of experimentally milled high-lysine corn (opaque-2) grits having 12.4 percent protein were hammer milled through a 0.027-inch mesh screen. The milled grits were then treated, sieved, and analyzed for protein and compared to grits which were hammer milled and sieved without buffer treatment, as in Example 1, Table 4.

EXAMPLE 4

A 50-g. sample of experimentally milled high-lysine corn (opaque-2) flour having 10.0 percent protein was processed and compared to nontreated original flour as in Example 1, Table 4.

EXAMPLE 5

Fifty g. of commercial artificially dried normal corn grits containing 7.6 percent protein were hammer milled, buffer treated, sieved, and analyzed for protein as in Example 3, and compared to hammer milled, non-buffer treated, sieved original corn grits, Table 4.

EXAMPLE 6

Fifty-g. lots of experimentally milled high-lysine corn (opaque-2) flour having 6.3 percent protein were buffer treated as in Example 1. A portion of the dried material was sieved and analyzed and compared with nontreated and sieved original flour, as in Example 1, Table 4. A second portion was pin milled three times at 14,000 r.p.m. in an Alpine 16 Kolloplex pin mill and air classified by weight into five fractions in a Pillsbury laboratory model air classifier by a uniform standardized procedure, Griffin and Pfeifer, supra. A sample of the original flour was also pin milled and air classified as above. All air classified fractions were analyzed for protein content, Table 5.

EXAMPLE 7

Fifty g. of commercially obtained corn break flour having 5.8 percent protein was buffer treated and dried as in Example 1. One portion was sieved and analyzed for protein and compared to nontreated and sieved original flour. A second portion of the buffer treated material and a sample of the original corn flour were pin milled, air classified, and analyzed for protein as in Example 6, Table 6.

TABLE 5

| Fraction number | Weight (%) A[1] | Weight (%) B[2] | Protein (%) A[1] | Protein (%) B[2] |
| --- | --- | --- | --- | --- |
| 1 | 6.9 | 10.2 | 13.5 | 12.3 |
| 2 | 9.3 | 19.5 | 7.4 | 7.3 |
| 3 | 22.7 | 36.3 | 4.1 | 2.7 |
| 4 | 22.6 | 13.9 | 5.3 | 2.6 |
| 5 | 38.2 | 20.2 | 5.1 | 6.7 |

[1] A = Before treatment, original flour pin milled 3 times at 14,000 r.p.m.
[2] B = After treatment, pin milled 3 times at 14,000 r.p.m.

TABLE 6

| Fraction number | Weight (%) A[1] | Weight (%) B[2] | Protein (%) A[1] | Protein (%) B[2] |
| --- | --- | --- | --- | --- |
| 1 | 10.8 | 13.7 | 13.0 | 14.6 |
| 2 | 11.3 | 21.5 | 8.2 | 7.6 |
| 3 | 44.8 | 47.0 | 5.7 | 3.5 |
| 4 | 14.9 | 14.1 | 5.8 | 3.5 |
| 5 | 18.1 | 3.7 | 7.3 | 3.8 |

[1] A = Before treatment, original flour pin milled 3 times at 14,000 r.p.m.
[2] B = After treatment, pin milled 3 times at 14,000 r.p.m.

We claim

1. In a process of preparing protein enriched products from cereal endosperm materials comprising the steps of:
   a. milling cereal endosperm materials; and
   b. classifying the milled cereal endosperm materials into products having varying protein concentrations;
   the improvement which comprises soaking the cereal endosperm materials prior to classifying in an isotonic buffer comprising 0.1M potassium phosphate buffer (pH 7.5) containing 0.006M magnesium chloride.
2. A process as described in claim 1 in which corn endosperm materials are soaked in an isotonic buffer.
3. A process as described in claim 1 in which sorghum endosperm materials are soaked in an isotonic buffer.
4. A process as described in claim 1 in which wheat endosperm materials are soaked in an isotonic buffer.

5. A process of sloughing the protein sheath from milled starch granules in cereal endosperm materials comprising soaking cereal endosperm material in an isotonic buffer comprising 0.1M potassium phosphate buffer (pH 7.5) containing 0.006M magnesium chloride, drying, and classifying the resultant product into products having varying protein concentrations.

6. A process as described in claim 5 in which corn endosperm materials are soaked in an isotonic buffer.

7. A process as described in claim 5 in which sorghum endosperm materials are soaked in an isotonic buffer.

8. A process as described in claim 5 in which wheat endosperm materials are soaked in an isotonic buffer.

* * * * *